United States Patent
Kelly

(10) Patent No.: US 10,601,913 B2
(45) Date of Patent: Mar. 24, 2020

(54) SYNCHRONIZATION OF USER DATA IN A VIRTUAL DESKTOP ENVIRONMENT

(71) Applicant: Wyse Technology L.L.C., Santa Clara, CA (US)

(72) Inventor: John Kelly, Mallow (IE)

(73) Assignee: Wyse Technology L.L.C., Santa Clara, CA (US)

( * ) Notice: Subject to any disclaimer, the term of this patent is extended or adjusted under 35 U.S.C. 154(b) by 226 days.

(21) Appl. No.: 15/381,504

(22) Filed: Dec. 16, 2016

(65) Prior Publication Data
US 2018/0176299 A1   Jun. 21, 2018

(51) Int. Cl.
| | |
|---|---|
| *G06F 15/16* | (2006.01) |
| *H04L 29/08* | (2006.01) |
| *G06F 16/178* | (2019.01) |
| *G06F 16/17* | (2019.01) |
| *G06F 9/451* | (2018.01) |
| *G06F 9/445* | (2018.01) |

(52) U.S. Cl.
CPC ........ *H04L 67/1095* (2013.01); *G06F 9/4451* (2013.01); *G06F 9/452* (2018.02); *G06F 16/178* (2019.01); *G06F 16/1734* (2019.01); *H04L 67/06* (2013.01)

(58) Field of Classification Search
CPC ... H04L 67/1095; H04L 67/42; H04L 67/306; H04L 67/06; G06F 17/30144; G06F 17/30174; G06F 17/30215
USPC .......................................................... 709/203
See application file for complete search history.

(56) References Cited

U.S. PATENT DOCUMENTS

| | | | | |
|---|---|---|---|---|
| 2003/0084104 A1* | 5/2003 | Salem | ............... | G06F 17/30174 709/205 |
| 2011/0209064 A1* | 8/2011 | Jorgensen | ............... | G06F 9/455 715/733 |
| 2012/0226742 A1* | 9/2012 | Momchilov | .......... | G06F 3/1454 709/203 |
| 2015/0365439 A1* | 12/2015 | Liverance | ........... | H04L 63/0823 726/1 |
| 2016/0378461 A1* | 12/2016 | Huang | .................... | G06F 13/42 717/169 |

* cited by examiner

*Primary Examiner* — Umar Cheema
*Assistant Examiner* — Anh Nguyen
(74) *Attorney, Agent, or Firm* — Kirton McConkie; Brian Tucker

(57) ABSTRACT

User data can be synchronized over a virtual channel in a virtual desktop environment. A synchronization service can be included with a virtual desktop client and in the virtual desktop and can employ the virtual channel to transmit and receive new and updated user data. In this way, the user data can be synchronized without requiring any kind of file sharing between the access device and the virtual desktop and without requiring membership in any directory service. Therefore, user data can be synchronized in virtual desktop environments that employ a number of different operating systems and network security settings.

20 Claims, 7 Drawing Sheets

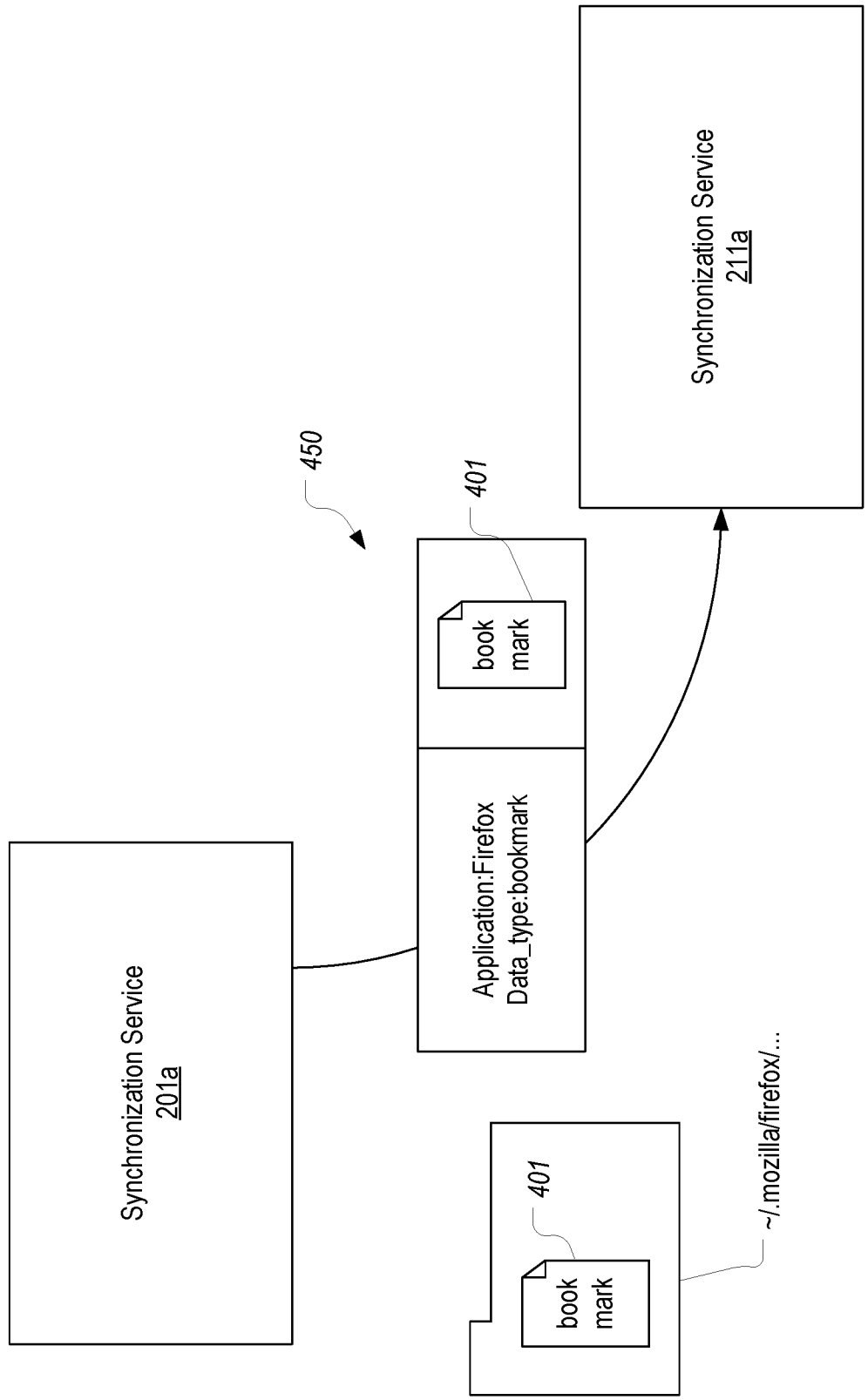

SYNCHRONIZATION OF USER DATA IN A VIRTUAL DESKTOP ENVIRONMENT

CROSS-REFERENCE TO RELATED APPLICATIONS

N/A

BACKGROUND

Some computing platforms provide a feature that allows a user to receive the same user profile regardless of which computer the user employs to access a desktop. For example, in Windows, this technology is known as roaming user profiles. Other examples include Liquidware Labs' ProfileUnity and AppSense's Environment Manager. These tools are commonly referred to as User Environment Management (UEM) tools. Typically, UEM tools function by storing the user profile (e.g., the user's desktop configuration and personal files) on a network-accessible server. Then, when the user logs in to any network-connected computer, the user profile can be retrieved from the server and applied on the computer.

One common scenario where this type of "centralized" user profile is provided is in a virtual desktop infrastructure. For example, it is becoming more common for entities to implement a thin client environment in which the thin clients employ a remote display protocol (e.g., Microsoft's Remote Desktop Protocol or RDP) to access a virtual desktop on a server. In these environments, even though the desktop and the majority of applications may be executed on the server, there may still be some applications that are locally executed (i.e., executed directly on the thin client as opposed to within the virtual desktop). Examples of these locally executed applications include an internet browser, the virtual desktop client, lightweight office tools such as an XPS viewer, driver configuration utilities, etc.

Oftentimes, a key requirement for implementing an acceptable thin client (or virtual desktop) environment is that the virtual desktop appears as similar as possible to a local desktop. In other words, it is desirable to make the virtual desktop appear to the user as if it were a typical desktop. To accomplish this in scenarios where some applications are locally executed, it is desirable to synchronize user settings between the local device and the virtual desktop. For example, if a browser is locally installed and also available within the virtual desktop, any user-specific configurations made in one browser instance can be maintained in (or synchronized to) a centralized user profile so that the user will have the same experience regardless of which browser instance he or she is using. This synchronization will also ensure that any user settings that are applied on the local browser while using one device to access a virtual desktop will be retained and applied when the user employs a different device to access a virtual desktop.

Currently, to perform this type of synchronization between a thin client or any other type of client device (hereinafter generally "access device") and the virtual desktop, each access device must be a member of a common directory service. For example, to provide roaming user profiles in a Windows-based virtual desktop environment, the access devices must be members of the same Active Directory domain. In particular, the Active Directory identification features can be employed to identify which user profile should be applied whenever a user logs in to a virtual desktop. However, in many cases, it is not feasible or even possible for all access devices to be part of the same directory service. For example, if the access devices run a non-Windows OS, it may not be possible to join them to an Active Directory domain.

Further, to fully implement a centralized user profile experience, current UEM tools require that a single file-sharing technology be used across all access devices (e.g., to enable a user's personal files to be available on any access device). Unfortunately, the access devices oftentimes run an OS that does not support the necessary file-sharing technology or that is not sufficiently secure to be granted file share access. Finally, current UEM tools oftentimes require that the access devices have a certain level of network access to the virtual desktop as well as to the UEM portal itself that cannot be provided due to security concerns. In many cases, the only access that the access device may have is through the remote display protocol thereby making current UEM tools unsuitable for many situations. For each of these reasons, it has not been feasible to synchronize user profiles in many virtual desktop environments especially those that include thin client access devices that do not run Windows.

BRIEF SUMMARY

The present invention extends to methods, systems, and computer program products for synchronizing user data in a virtual desktop environment. This user data can be synchronized between an access device and a virtual desktop using a virtual channel in the remote display protocol. In this way, the user data can be synchronized without requiring any kind of file sharing between the access device and the virtual desktop and without requiring membership in any directory service. Therefore, user data can be synchronized in virtual desktop environments that employ a number of different operating systems and network security settings.

In one embodiment, the present invention is implemented by a synchronization service in a virtual desktop infrastructure environment as method for synchronizing user data via a virtual channel. The synchronization service monitors a file system location. In response to determining that user data has been created or updated in the file system location, the synchronization service sends a communication over a virtual channel, the communication including the created or updated user data.

In another embodiment, the present invention is implemented by a synchronization service in a virtual desktop infrastructure environment as a method for synchronizing user data via a virtual channel. The synchronization service receives a communication via a virtual channel, the communication including user data. The synchronization service stores the user data at a particular file system location.

In another embodiment, the present invention is implemented as a system for synchronizing user data over a virtual channel. The system includes a virtual desktop client configured to execute on an access device and to communicate with a server to establish a virtual desktop, the virtual desktop client including a client-side synchronization service, and a server-side synchronization service that executes within the virtual desktop. The client-side synchronization service and the server-side synchronization service are each configured to function as endpoints of a virtual channel for the purpose of synchronizing user data between the access device and the virtual desktop.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 4A provides another example of how user data can be synchronized over a virtual channel;

DETAILED DESCRIPTION

In this specification, an access device should be construed as any computing device that uses a remote display protocol to access a virtual desktop on a server. An access device may typically be a thin client. A remote display protocol should include, but should not be limited to, Microsoft's remote desktop protocol (RDP), Citrix's independent computing architecture (ICA) protocol, and VMware's PCoIP protocol which are currently the most common remote display protocols.

User data should be construed as comprising any user-specific customizations to an application or to the operating system. For example, in Windows environments, user data would typically include registry settings for a particular application and files stored in a particular application's subfolder in the AppData folder. In a Linux environment, user data would typically include files stored in an application-specific folder in the home directory. The specific type and/or storage location of user data is not essential to the invention. Of importance is the fact that user data will be generated and stored locally on an access device.

As a particular example of user data that many users would be familiar with, when a user adds a favorite in a local instance of Internet Explorer, a "pin" folder is created in the C:\Users\User\AppData\Local\Microsoft\Internet Explorer\Tiles folder and an msapplication.xml file defining the favorite is stored in the pin folder. Similarly, if the user adds a favorite in an instance of Internet Explorer executing within a virtual desktop, a corresponding pin folder and msapplication.xml file will be created on the virtual machine that is executing the virtual desktop.

Figure 1:
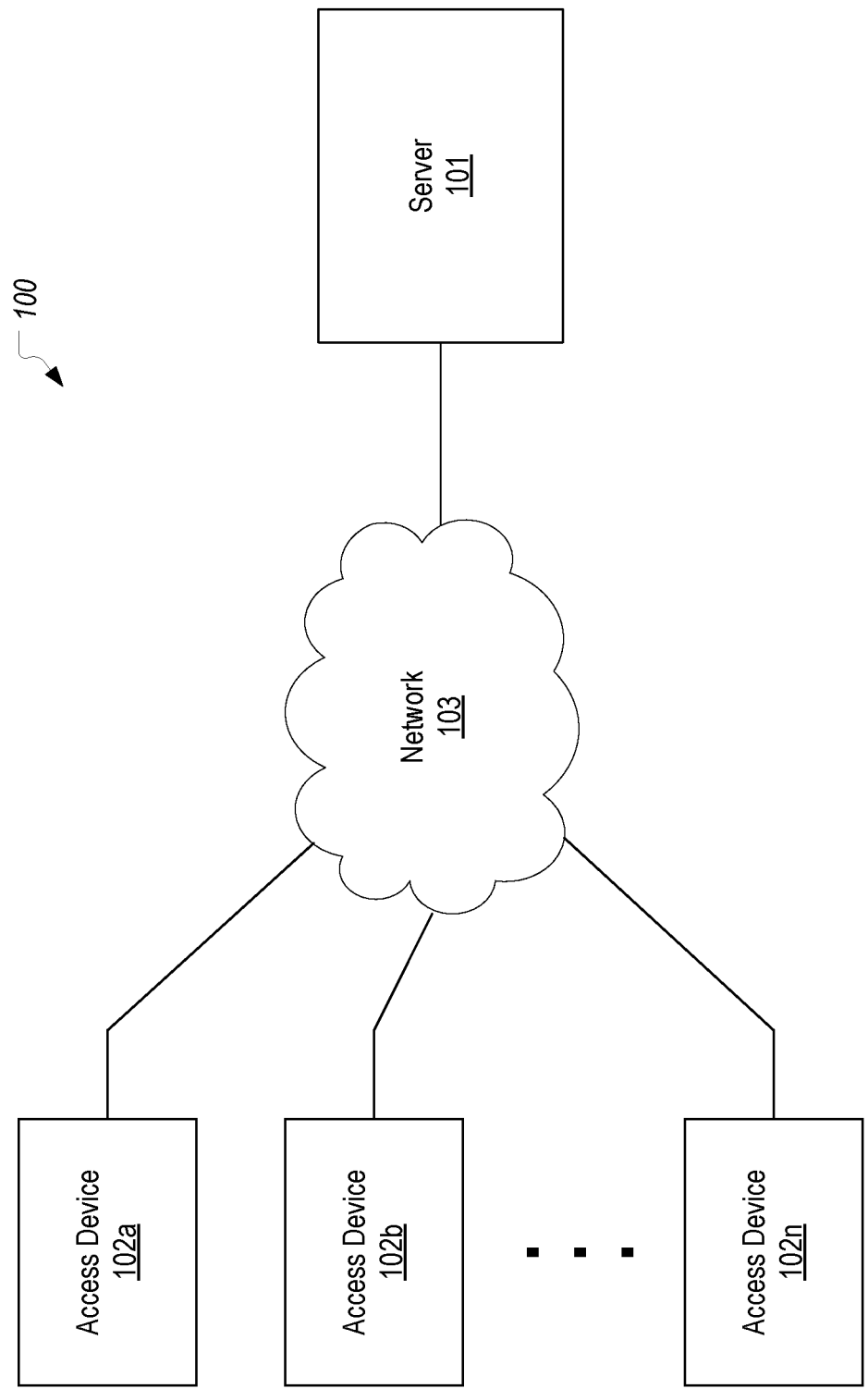
FIG. 1 illustrates an example computing environment in which the present invention can be implemented.

FIG. 1 illustrates an example computing environment 100 in which the present invention can be implemented. Computing environment 100 can include a server 101 and a number of access devices 102a-102n (where n represents some positive integer) that are connected to server 101 via a network 103. Network 103 can be any suitable network including a LAN or the internet. As mentioned above, each of access devices 102a-102n can be configured to establish a virtual desktop on server 101 using a remote display protocol. In other words, access devices 102a-102n establish remote sessions with server 101.

Figure 2:
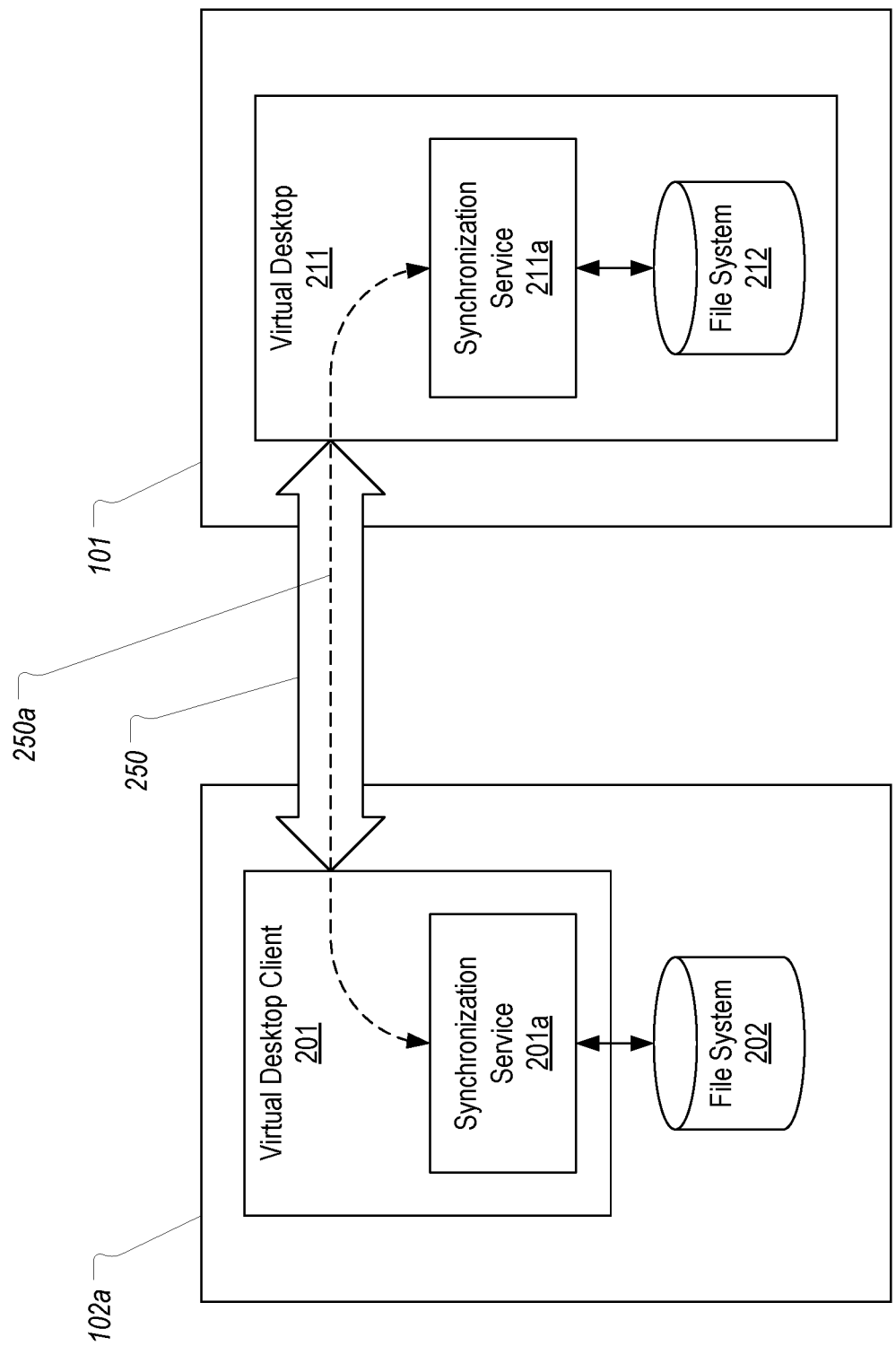
FIG. 2 illustrates an example architecture of the present invention.

As shown in FIG. 2, in order to establish a virtual desktop connection, each access device (with access device 102a being shown in this figure) can include a virtual desktop client 201. Although not shown, server 101 can include suitable components (e.g., Terminal Server in Windows server environments) to allow virtual desktop client 201 to access a virtual desktop 211 on server 101. Virtual desktop client 201 can communicate with virtual desktop 211 over connection 250 using a suitable remote display protocol.

In accordance with embodiments of the present invention, virtual desktop client 201 and virtual desktop 211 can be configured to include synchronization service 201a and 211a respectively as shown in FIG. 2. As an overview, synchronization services 201a, 211a can function as endpoints (e.g., dynamic virtual channel endpoints) that communicate with each other over a virtual channel 250a for the purpose of synchronizing user data between an access device and a virtual desktop. Synchronization services 201a, 211a can each be configured to interface with file systems 202, 212 respectively to identify when user data has been created and/or updated and can then initiate a synchronization process over virtual channel 250a.

Synchronization services 201a, 211a can be configured to monitor for specific types of user data. For example, the user, an administrator, or policy can dictate which locations (e.g., folders, registry settings, etc) within file systems 202a, 212a should be monitored for the addition of or updates to user data stored therein. As a particular example, as part of configuring an account for a user, an administrator may configure virtual desktop client 201 (or may create a policy that will configure virtual desktop client 201 whenever the user logs in) so that synchronization service 201a will monitor the contents of specified folders. In the case where access device 102a is Linux-based, these folders may be application-specific folders stored in the user's home directory. In contrast, in the case where access device 102a is Windows-based, these folders may be application-specific folders stored in the AppData folder. As another Windows-based example, synchronization service 201a may be configured to monitor particular registry keys. In any case, regardless of which operating system is employed on access device 102a, synchronization service 201a can be configured to monitor particular locations within file system 202 to detect when user data has been created and/or changed.

The same type of configuration can occur on the server side. In particular, for each type of user data that synchronization service 201a is configured to monitor, synchronization service 211a can also be configured to monitor the same type of user data. More specifically, for any application that may be (1) locally executed on access device 102a (and would therefore store its user data in file system 202) and (2) executed within virtual desktop 211 (and would therefore store its user data in file system 212), synchronization services 201a, 211a can be configured to monitor file systems 202, 212 respectively for user data pertaining to that application.

In some embodiments, synchronization services 201a, 211a can be configured to perform this monitoring periodically. For example, each of synchronization services 201a, 211a can be configured to scan any configured locations at ten minute intervals to determine whether any files/data have been added or whether any files/data have changed since the last monitoring. Therefore, if a user creates a favorite in a locally executing browser that stores its user data at ~/.browser in file system 202, synchronization service 201a would detect that a new file or updated file exists in this ~/.browser folder at the next monitoring. Similarly, if a user creates a favorite in a browser that is executing within virtual desktop 211 that stores its data at ~/.browser in file system 212, synchronization service 211a would detect that a new file or updated file exists in this ~/.browser folder at the next monitoring.

It is noted that the present invention can be implemented even when the access device and the server do not employ the same operating system. For example, access device 102a may be running a Linux-based OS while server 101 may be running Windows. Even in such cases, synchronization services 201a, 211a can still monitor the appropriate locations for changes and/or additions of user data pertaining to applications that may be executed both locally and within virtual desktop 211. As a particular example similar to the browser example above, when access device 102a is Linux-based, synchronization service 201a may be configured to monitor for browser user data in the ~/.browser folder whereas, when server 101 is running Windows, synchronization service 211a may be configured to monitor for browser user data in the AppData/browser folder. In such a scenario, it is assumed that the browser (e.g., Firefox) will store the same type of files containing user data in the respective folder and that therefore such files could be replicated to synchronize the user experience. However, in some embodiments, a particular application may store its user data differently depending on the host operating system. In these embodiments, synchronization services 201a, 211a could be configured to convert user data into an appropriate format as part of the synchronization process. For example, when executing on Windows, an application may store some user data in the registry whereas, when executing on Linux, the application may store the same type of user data in a folder. In this scenario, synchronization services 201a, 211a can include logic for mapping the user data from a registry location to a particular file and/or format in a folder.

Once either synchronization service 201a or synchronization service 211a detects that new and/or updated user data exists in a monitored location, the synchronization service can obtain a copy of the user data and transmit it over virtual channel 250a to the other synchronization service. Accordingly, as indicated above, each of synchronization services 201a, 211a can function as a virtual channel endpoint by listening for communications from the other synchronization service. Then, upon receiving user data over virtual channel 250a, the synchronization service can copy the user data to the appropriate location in the corresponding file system such that the application will apply the user data to synchronize the user experience between the local and virtual desktop instances of the application.

Figure 3:
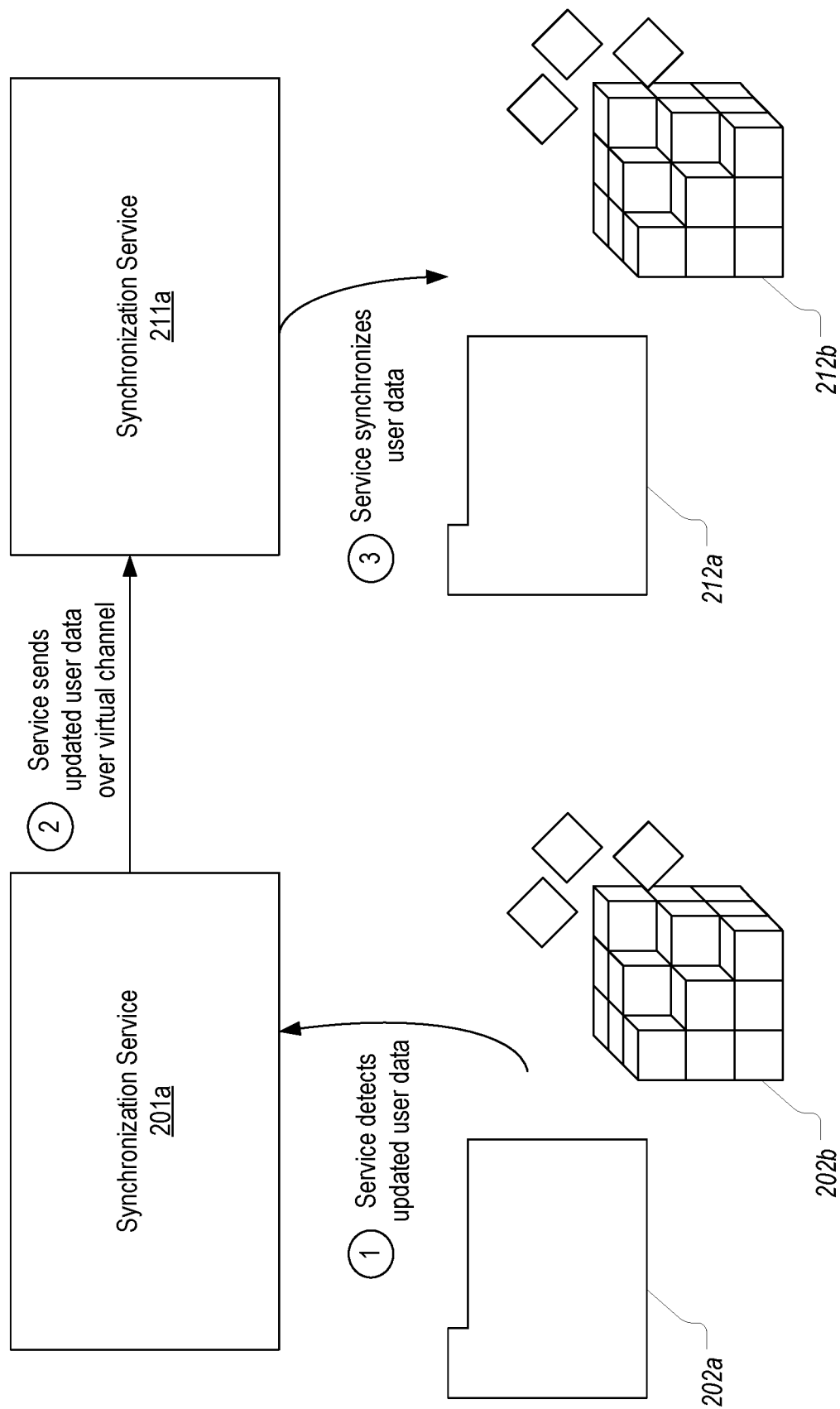
FIG. 3 illustrates how user data can be synchronized in accordance with one or more embodiments of the present invention.

FIG. 3 generally illustrates this process when user data is updated by an application that is executing locally on access device 102a. For illustrative purposes, it will be assumed in this example that the application stores user data in a folder 202a as well as in registry location 202b on access device 102a. Accordingly, it will also be assumed that synchronization service 201a is configured to monitor folder 202a and registry location 202b for new and updated user data.

In step 1, synchronization service 201a detects that updated user data exists in folder 202a and registry location 202b. As indicated above, this detection could occur as part of a periodic scanning of these locations. The detection could also occur at other times such as in response to a user's request to synchronize, when the user attempts to log out of or into a virtual desktop, etc. In any case, upon detecting that updated user data exists, in step 2, synchronization service 201a can obtain a copy of the updated user data and encapsulate it appropriately for transmission to synchronization service 211a via virtual channel 250a. More detail regarding how this user data can be encapsulated (or formatted) for transmission over the virtual channel will be provided below. Finally, in step 3, upon receiving the updated user data via the virtual channel, synchronization service 211a can store the copy of the user data in folder 212a and registry location 212b. In short, in this example, synchronization services 201a, 211a employ a virtual channel to synchronize the contents of folder 202a and registry location 202b to folder 212a and registry location 212b and vice versa.

Of course, not all content of these locations need be synchronized. In some embodiments, the configuration of synchronization services 201a, 211a can include specifying particular types of user data within a particular location to synchronize rather than only specifying particular locations. Therefore, the present invention extends to embodiments where the synchronization service may be configured to monitor a particular location for new and/or updated user data of a particular type rather than of all types.

Figure 4:
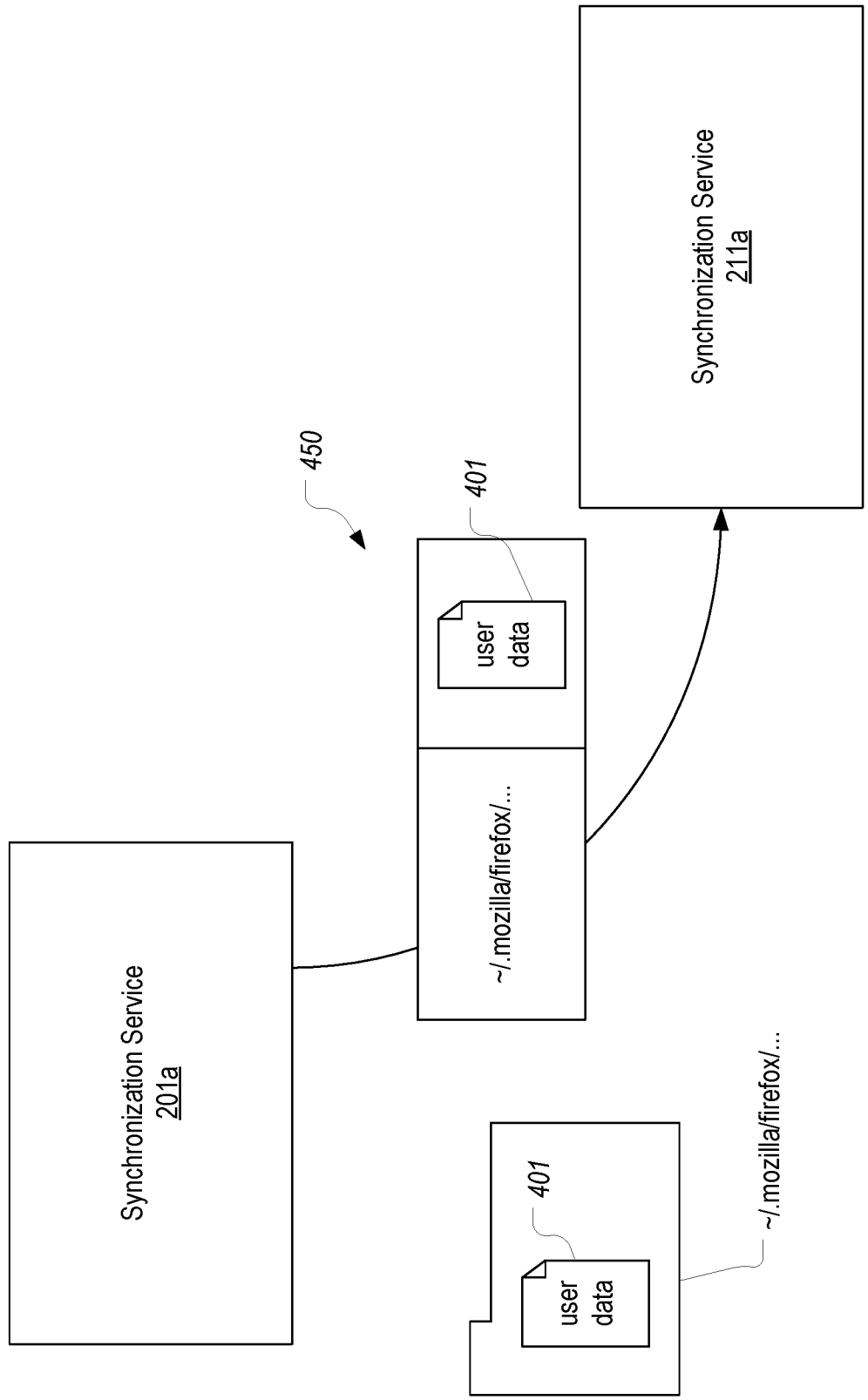
FIG. 4 provides an example of how user data can be synchronized over a virtual channel.

FIG. 4 provides a generalized example of a communication 450 that can be sent by one synchronization service to inform the other synchronization service of new and/or updated user data that should be synchronized. In this example, it is assumed that synchronization service 201a is configured to monitor the ~/.mozilla/firefox/ . . . folder for new and/or updated user data and that a file 401 has been added to this folder. Accordingly, synchronization service 201a is shown as sending communication 450 to synchronization service 211a which includes file 401. Additionally, communication 450 is shown as including the path of the folder in which file 401 is stored on access device 102a. By providing the folder path in communication 450, synchronization service 211a can identify the location in file system 212 where file 401 should be stored. In this example, synchronization service 211a can extract file 401 from communication 450 and then use appropriate file system requests to store file 401 in file system 212 at the location ~/.mozilla/firefox/ . . . . This approach may be employed when the same file system is used on the access device and the server (e.g., when both are running an instance of Windows that is configured to store user data in the AppData folder).

Alternatively, rather than providing the file system path to the location where the user data is stored in the source file system, the synchronization service could instead provide an identifier of the application to which the user data pertains and possibly an identifier of the type of user data. For example, in FIG. 4A, it is assumed that file 401 defines a bookmark that has been added to the local instance of Firefox. Based on the location where file 401 is stored and the file type, filename, and/or contents of the file, synchronization service 201a could determine that file 401 pertains to the application Firefox and that it contains user data defining a bookmark. Accordingly, synchronization service 201a could format communication 450 to include headers of Application:Firefox and Data type:bookmark to thereby inform synchronization service 211a of what file 401 is and to which application it pertains. In this scenario, synchronization service 211a can employ these headers to determine where file 401 should be stored in file system 212 including possibly reformatting file 401 or its contents appropriately for use by the instance of the application executing in the virtual desktop.

The technique represented in FIG. 4A may be preferred in many instances since it facilitates synchronization in heterogeneous environments (e.g., when the access device is running Linux and the virtual desktop is a Windows desktop). More particularly, in heterogeneous environments, the file system path to the application's user data will typically not be the same on the access device as it is in the virtual desktop. The initial configuration of the synchronization services can account for these scenarios by providing the proper logic to enable the mapping of the user data to the appropriate location (as well as possibly the reformatting of the user data).

Although the above-described examples illustrate user data created on an access device being synchronized to a virtual desktop, the same process can be employed to synchronize user data created on the virtual desktop to an access device. Additionally, this process can be performed with any number of different access devices from which a user may establish a remote session. For example, if the user of access device 102a were to subsequently establish a virtual desktop on server 101 using access device 102b, any user data that had been synchronized to the virtual desktop when the user was employing access device 102a (assuming that the user data is persisted across sessions) can be synchronized to access device 102b so that the user will have the same experience while executing an application locally on access device 102b as he or she had when executing the same application locally on access device 102a (or equally within virtual desktop 211).

In some embodiments, a conflict may occur during the synchronization process. For example, if, during the synchronization interval, the user changed a particular setting to one value in the local instance of the application and to another value in the virtual desktop instance of the application, the question arises as to which value should be synchronized. To address these conflict scenarios, synchronization services 201a, 211a can be configured to apply conflict resolution rules. For example, the synchronization services may apply a "most recent setting wins" rule, a "virtual desktop setting wins" rule, a "local instance setting wins" rule, or any other suitable rule.

As a particular example, a user may run a local instance of an XPS viewer and change a user setting to a first value at a first time. Then, prior to synchronization service 201a detecting and sending the change over the virtual channel, the user may run a virtual desktop instance of the XPS viewer and change the same user setting to a second value at a second, subsequent time. After this second time, it will be assumed that synchronization service 201a sends a communication to synchronization service 211a indicating that the user setting has been changed to the first value. In response, synchronization service 211a can attempt to update the user setting to the first value (e.g., by updating a registry setting, by replacing an existing file with a new file, by updating contents of an existing file, etc.). However, in this attempt, synchronization service 211a may discover that the user setting has already been updated on the virtual desktop and not synchronized to the access device.

To enable a "most recent setting wins" rule, the synchronization services can include an indication of when the user data was created and/or updated in the virtual channel communication. For example, the communication could include a timestamp defining when the user data was created or updated. Alternatively, when a file containing the user data is transmitted, the file itself may include a "last modified" timestamp that could be employed. In short, any suitable file system technique could be employed to determine and/or indicate when user data was created and/or updated. By specifying this type of timestamp when sending user data over the virtual channel, the receiving synchronization service can make an appropriate determination of whether to persist the received user data or to discard it in favor of a more recent change. In some embodiments, rather than explicitly identifying a timestamp in a virtual channel communication, the receiving synchronization service could employ the time when the virtual channel communication is received as the effective time of the creation and/or update of the received user data.

Figure 5:
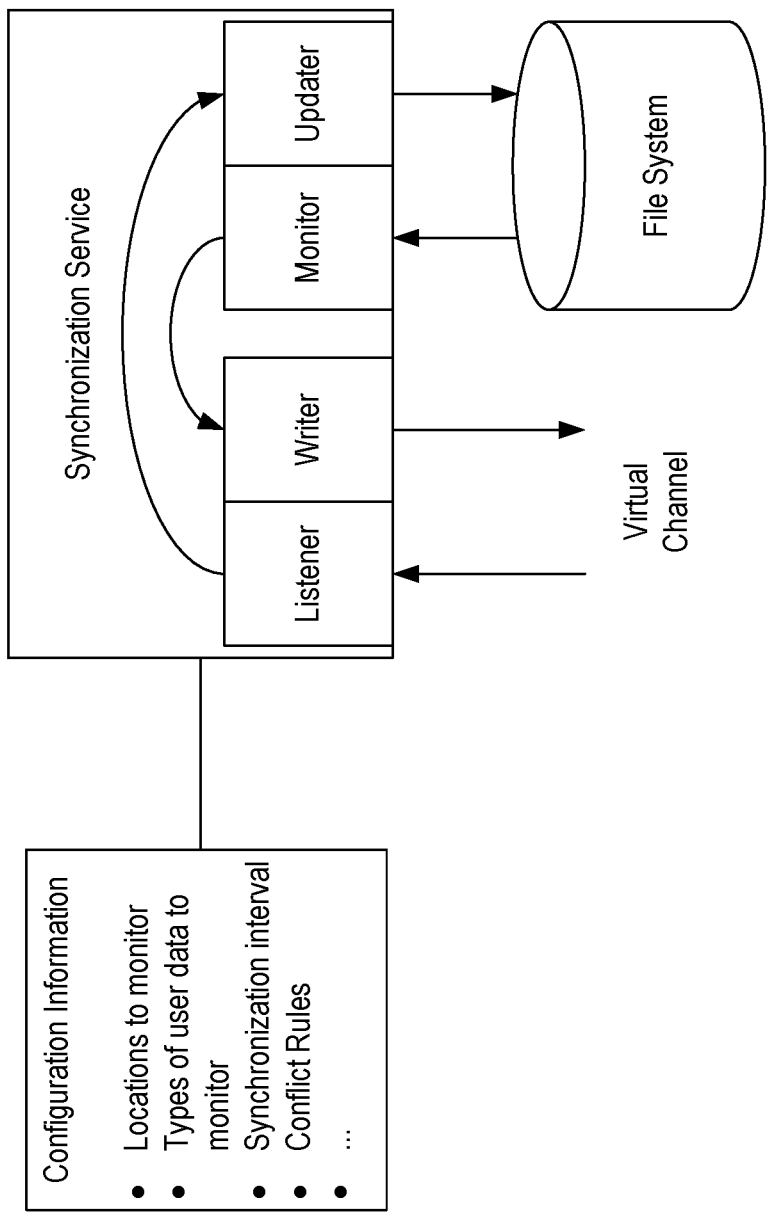
FIG. 5 illustrates an example of various components that a synchronization component can include to enable synchronizing user data over a virtual channel.

To summarize, FIG. 5 illustrates the general architecture and function of the synchronization service. As shown, each instance of the synchronization service can include configuration information for controlling its functionality including, for example, defining which locations in the file system to monitor, which types of user data to monitor, a synchronization interval (which may be continuous), rules to apply when a conflict occurs, etc. Each synchronization service can also include four general components: a listener, a writer, a monitor, and an updater. As described above, the monitor can be tasked with monitoring for changes in user data based on the configuration information. The monitor can then provide information regarding such changes, including the changed user data itself, to the writer for transmission over the virtual channel. The listener can be tasked with receiving any user data from the synchronization service on the opposite end of the virtual channel and can relay this user data to the updater which can update the file system in accordance with the configuration information such as in accordance with any defined conflict rules.

The use of these synchronization services as virtual channel endpoints enables the synchronization of user data in any environment. Because a virtual channel is employed, there is no requirement that any kind of file sharing exist between the access device and the server. There is also no requirement that the access device and the server belong to any directory service. Instead, the remote display protocol itself is used as the means for enabling synchronization. As such, the present invention facilitates the synchronization of user data in environments where non-Windows-based access devices are employed. Also, even in Windows-based environments, the present invention provides a streamlined approach for synchronization.

Figure 6:
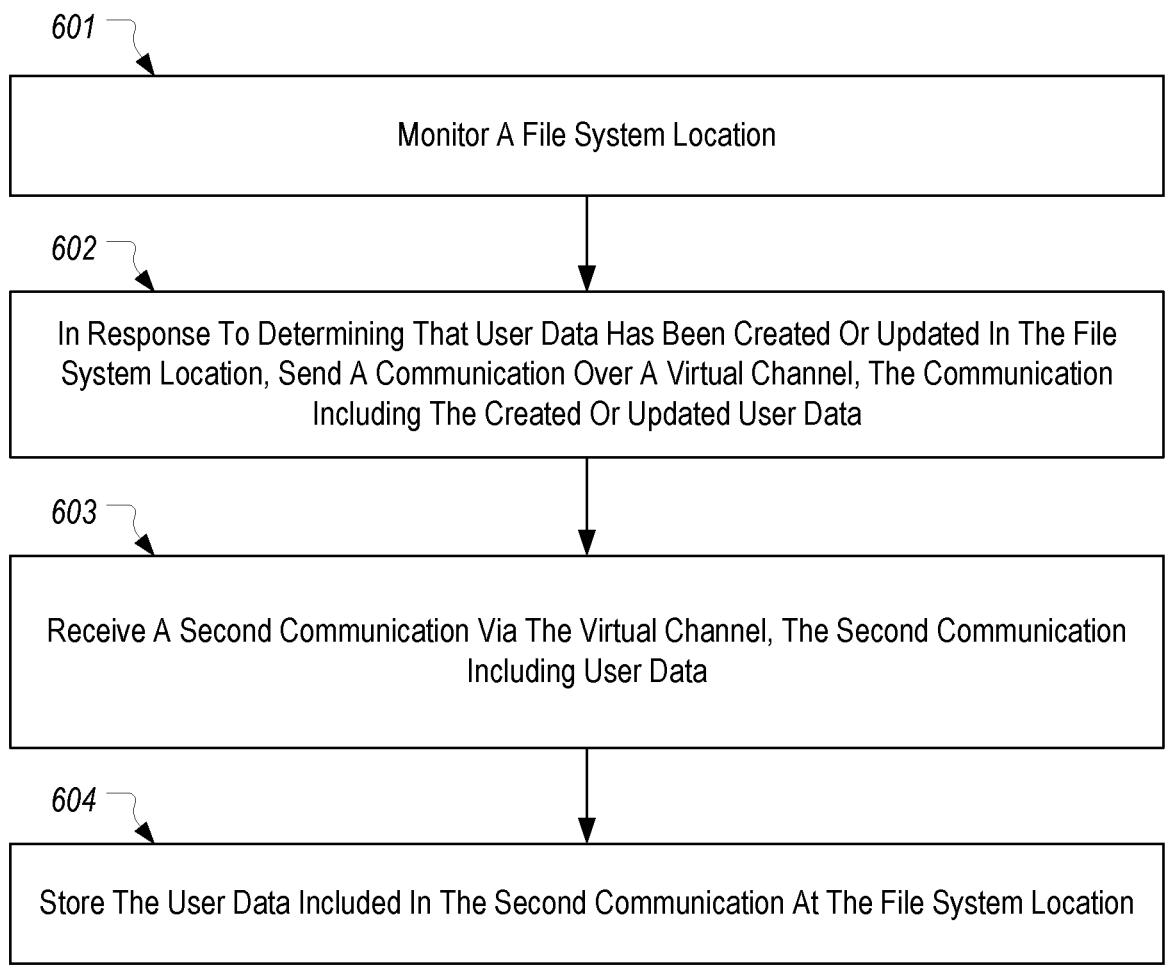
FIG. 6 illustrates a flowchart of an example method for synchronizing user data over a virtual channel.

FIG. 6 provides a flowchart of an example method 600 for synchronizing user data over a virtual channel. Method 600 can be implemented by a synchronization service executing on either the server or an access device.

Method 600 includes an act 601 of monitoring a file system location. For example, synchronization service 201a/211a can monitor a particular application's folder in file system 202/212.

Method 600 includes an act 602 of, in response to determining that user data has been created or updated in the file system location, sending a communication over a virtual channel, the communication including the created or updated user data. For example, synchronization service 201a can send communication 450 over virtual channel 250a to synchronization service 211a.

Method 600 includes an act 603 of receiving a second communication via the virtual channel, the second communication including user data. For example, synchronization service 211a can receive communication 450 over virtual channel 250a.

Method 600 includes an act 604 of storing the user data included in the second communication at the file system location. For example, synchronization service 201a/211a can store user data at an appropriate location in file system 202/212.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method for synchronizing user-specific configuration settings for two instances of an application via a virtual channel, the method comprising:
    establishing a virtual desktop connection by which an access device accesses a virtual desktop on a server;
    while the virtual desktop connection is established, executing a client-side synchronization service and a server-side synchronization service that each function as a virtual channel endpoint for a virtual channel in the virtual desktop connection;
    monitoring, by the client-side synchronization service, a client-side file system location that stores user-specific configuration settings for a first instance of a first application that executes locally on the access device;
    in response to determining that user-specific configuration settings for the first instance of the first application have been created or updated in the client-side file system location, sending, by the client-side synchronization service, a communication over the virtual channel, the communication including the created or updated user-specific configuration settings for the first instance of the first application, an identification of the first application and an identification of a type of the user-specific configuration settings;
    receiving, by the server-side synchronization service and via the virtual channel, the communication;
    employing, by the server-side synchronization service, the identification of the first application and the identification of the type of the user-specific configuration settings to locate a server-side file system location that stores user-specific configuration settings for a second instance of the first application that executes on the virtual desktop; and
    storing, by the server-side synchronization service, the created or updated user-specific configuration settings for the first instance of the first application in the server-side file system location that stores user-specific configuration settings for the second instance of the first application that executes on the virtual desktop to thereby cause the second instance of the first application to be customized in accordance with the created or updated user-specific configuration settings for the first instance of the first application.

2. The method of claim 1, wherein the client-side synchronization service monitors the client-side file system location periodically to determine whether user-specific configuration settings for the first instance of the first application have been created or updated.

3. The method of claim 1, wherein an operating system of the access device is different from an operating system of the server.

4. The method of claim 1, wherein the client-side file system location that stores user-specific configuration settings for the first instance of the first application includes a registry such that the created or updated user-specific configuration settings for the first instance of the first application include one or more registry settings.

5. The method of claim 1, wherein the created or updated user-specific configuration settings for the first instance of the first application include one or more registry settings and one or more files.

6. The method of claim 1, wherein the created or updated user-specific configuration settings for the first instance of the first application include one or more files, and wherein storing the created or updated user-specific configuration settings for the first instance of the first application in the server-side file system location that stores user-specific configuration settings for the second instance of the first application comprises converting content of the one or more files into one or more registry settings and storing the one or more registry settings in a registry.

7. The method of claim 1, wherein the client-side synchronization service maintains configuration information that defines a particular type of user-specific configuration settings to be monitored.

8. The method of claim 1, wherein the first application is a browser.

9. The method of claim 1, further comprising:
    receiving, by the client-side synchronization service, a second communication via the virtual channel, the second communication including user-specific configuration settings for the second instance of the first application that executes on the virtual desktop; and
    storing, by the client-side synchronization service, the user-specific configuration settings for the second instance of the first application in the client-side file system location.

10. The method of claim 9, wherein the second communication also includes an identification of the first application and an identification of a type of the user-specific configuration setting for the second instance of the first application.

11. The method of claim 9, further comprising:
    accessing, by the client-side synchronization service, the client-side file system location to determine whether the user-specific configuration settings for the second instance of the first application conflict with user-specific configuration settings for the first instance of the first application stored in the client-side file system location such that the user-specific configuration settings for the second instance of the first application are only stored at the client-side file system location after one of: determining that no conflict exists; or determining that a conflict exists but one or more conflict rules indicate that the user-specific configuration settings for the second instance of the first application should be stored at the client-side file system location.

12. The method of claim 11, wherein the user-specific configuration settings for the second instance of the first application were created or updated after the conflicting user-specific configuration settings for the first instance of the first application, and the one or more conflict rules indicate that most recently created or updated user-specific configuration settings should be stored in place of less recently created or updated user-specific configuration settings.

13. The method of claim 11, wherein the user-specific configuration settings for the second instance of the first application are one or both of a file and a registry setting.

14. The method of claim 1, wherein the virtual channel is a dynamic virtual channel.

15. One or more non-transitory computer storage media storing computer executable instructions which when executed implement a method for synchronizing user-specific configuration settings for two instances of an application via a virtual channel, the method comprising:
   establishing a virtual desktop connection by which an access device accesses a virtual desktop on a server;
   while the virtual desktop connection is established, executing a client-side synchronization service and a server-side synchronization service that each function as a virtual channel endpoint for a virtual channel in the virtual desktop connection;
   monitoring, by the client-side synchronization service, a client-side file system location that stores user-specific configuration settings for a first instance of a first application that executes locally on the access device;
   in response to determining that user-specific configuration settings for the first instance of the first application have been created or updated in the client-side file system location, sending, by the client-side synchronization service, a communication over the virtual channel, the communication including the created or updated user-specific configuration settings for the first instance of the first application, an identification of the first application and an identification of a type of the user-specific configuration settings;
   receiving, by the server-side synchronization service and via the virtual channel, the communication;
   employing, by the server-side synchronization service, the identification of the first application and the identification of the type of the user-specific configuration settings to locate a server-side file system location that stores user-specific configuration settings for a second instance of the first application that executes on the virtual desktop; and
   storing, by the server-side synchronization service, the created or updated user-specific configuration settings for the first instance of the first application in the server-side file system location that stores user-specific configuration settings for the second instance of the first application that executes on the virtual desktop to thereby cause the second instance of the first application to be customized in accordance with the created or updated user-specific configuration settings for the first instance of the first application.

16. The non-transitory computer storage media of claim 15, wherein storing the created or updated user-specific configuration settings for the first instance of the first application in the server-side file system location comprises converting the created or updated user-specific configuration settings for the first instance of the first application into a format used by the second instance of the first application.

17. The non-transitory computer storage media of claim 15, wherein the client-side file system location that stores user-specific configuration settings for the first instance of the first application includes a registry such that the created or updated user-specific configuration settings for the first instance of the first application include one or more registry setting.

18. The non-transitory computer storage media of claim 15, wherein the method further comprises:
   receiving, by the client-side synchronization service, a second communication via the virtual channel, the second communication including user-specific configuration settings for the second instance of the first application that executes on the virtual desktop; and
   storing, by the client-side synchronization service, the user-specific configuration settings for the second instance of the first application in the client-side file system location.

19. A method for synchronizing user-specific configuration settings for two instances of an application via a virtual channel, the method comprising:
   establishing a virtual desktop connection by which an access device accesses a virtual desktop on a server;
   while the virtual desktop connection is established, executing a client-side synchronization service and a server-side synchronization service that each function as a virtual channel endpoint for a virtual channel in the virtual desktop connection;
   monitoring, by the server-side synchronization service, a server-side file system location that stores user-specific configuration settings for a first instance of a first application that executes on the virtual desktop;
   in response to determining that user-specific configuration settings for the first instance of the first application have been created or updated in the server-side file system location, sending, by the server-side synchronization service, a communication over the virtual channel, the communication including the created or updated user-specific configuration settings for the first instance of the first application, an identification of the first application and an identification of a type of the user-specific configuration settings;
   receiving, by the client-side synchronization service and via the virtual channel, the communication;
   employing, by the server-side synchronization service, the identification of the first application and the identification of the type of the user-specific configuration settings to locate a client-side file system location that stores user-specific configuration settings for a second instance of the first application that executes locally on the access device;
   storing, by the client-side synchronization service, the created or updated user-specific configuration settings for the first instance of the first application in the client-side file system location that stores user-specific configuration settings for the second instance of the first application that executes locally on the access device to thereby cause the second instance of the first application to be customized in accordance with the created or updated user-specific configuration settings for the first instance of the first application.

20. The method of claim 19, further comprising:
   prior to storing the created or updated user-specific configuration settings for the first instance of the first application in the client-side file system location, accessing, by the client-side synchronization service, the client-side file system location to determine whether the created or updated user-specific configuration settings for the first instance of the first application conflict with user-specific configuration settings for the second instance of the first application stored in the client-side file system location such that the created or updated user-specific configuration settings for the first instance of the first application are only stored at the client-side file system location after one of: determining that no conflict exists; or determining that a conflict exists but one or more conflict rules indicate that the created or updated user-specific configuration settings for the first instance of the first application should be stored at the client-side file system location.

\* \* \* \* \*